United States Patent
Chen et al.

(10) Patent No.: US 7,661,756 B2
(45) Date of Patent: Feb. 16, 2010

(54) BICYCLE SADDLE ASSEMBLY

(76) Inventors: Jia-Pin Chen, No. 51, Hengzun St., Dajia Township, Taichung County 437 (TW); Kuo-Chin Chao, No. 51, Hengzun St., Dajia Township, Taichung County 437 (TW)

( * ) Notice: Subject to any disclaimer, the term of this patent is extended or adjusted under 35 U.S.C. 154(b) by 80 days.

(21) Appl. No.: 11/521,555

(22) Filed: Sep. 15, 2006

(65) Prior Publication Data

US 2007/0210625 A1     Sep. 13, 2007

(30) Foreign Application Priority Data

Mar. 8, 2006  (TW) ............... 95203867 U
Jul. 24, 2006 (TW) ............... 95127043 A

(51) Int. Cl.
*B62J 1/00* (2006.01)
(52) U.S. Cl. .................. 297/202; 297/195.1; 297/215.1
(58) Field of Classification Search ................. 297/202, 297/195.1, 215.1
See application file for complete search history.

(56) References Cited

U.S. PATENT DOCUMENTS

| | | | | |
|---|---|---|---|---|
| 1,858,477 A | * | 5/1932 | Blake | ......................... 297/202 |
| 4,898,422 A | * | 2/1990 | West, III | .................... 297/202 |
| D375,425 S | * | 11/1996 | Gale | ........................... D6/502 |
| 5,645,315 A | * | 7/1997 | Walker et al. | ............. 297/215.1 |
| 6,039,395 A | * | 3/2000 | Culbertson | .................. 297/202 |
| 6,106,059 A | | 8/2000 | Minkow et al. | |
| 6,139,098 A | * | 10/2000 | Carrillo | ...................... 297/202 |
| 6,176,546 B1 | * | 1/2001 | Andrews | ................. 297/195.1 |
| 6,193,309 B1 | * | 2/2001 | Gootter et al. | ............. 297/202 |
| 6,224,151 B1 | * | 5/2001 | McMullen, Jr. | ............. 297/202 |
| 6,669,283 B2 | * | 12/2003 | Yu | ........................ 297/215.16 |
| 6,783,176 B2 | * | 8/2004 | Ladson, III | ................. 297/202 |
| 7,025,417 B2 | * | 4/2006 | Cohen | ..................... 297/195.1 |
| 7,121,622 B1 | * | 10/2006 | Mendez | ..................... 297/201 |
| 2006/0071516 A1 | * | 4/2006 | Pandozy | ..................... 297/202 |

FOREIGN PATENT DOCUMENTS

WO     WO 9211175 A1 *  7/1992

\* cited by examiner

*Primary Examiner*—Laurie K Cranmer

(57) ABSTRACT

A bicycle saddle assembly comprises a saddle body including a wider posterior portion for supporting bicycle rider's buttocks and a narrow anterior portion which fits between bicycle rider's crotch. The saddle body further includes a concave portion provided between the wider posterior portion and the narrow anterior portion. The saddle body has a highest area located on the wider posterior portion and a lowest area located on the concave portion to define an opening space with a sufficient depth above the concave portion so that, as riding, bicycle riders can arrange his perineal areas comfortably on the saddle body to relieve pressure placed thereon and dissipate heat generated therein.

18 Claims, 13 Drawing Sheets

BICYCLE SADDLE ASSEMBLY

BACKGROUND OF THE INVENTION

1. Field of the Invention

The present invention relates generally to bicycle saddles and more particularly to a bicycle saddle assembly that includes a saddle body having a space to arrange the rider's genital area and thereby at once reduces the pressure placed thereon and dissipates heat generated therein.

2. Description of the Related Art

Conventional bicycle seats or saddles are typically horizontal in profile with a narrow front end portion and a wider rear portion. The narrow front end portion creates a pressure zone on the perineal areas of the rider, which may adversely affect blood vessels and nerves and cause distress or injury to surrounding anatomical organs and tissues.

To try to avoid the drawbacks described above, U.S. Pat. No. 6,106,059 discloses a bicycle saddle having a front which broadens towards a rear that has a notched groove. In practical using, we can find that such a design can only relieve part of pressure placed on the perineal areas of the rider. Therefore, it is desirable to have a saddle with a construction that all of pressure placed on the perineal areas of the rider can be relieved.

SUMMARY OF THE INVENTION

It is the primary objective of the present invention to provide a bicycle saddle assembly with a space which can fully relieve pressure placed on the rider's perineal areas.

It is a further objective of the present invention to provide a bicycle saddle assembly with ventilation function for dissipating heat generated in the rider's perineal areas as riding.

In carrying out the foregoing objectives, a bicycle saddle assembly in accordance with the present invention comprises a saddle body including a wider posterior portion for supporting bicycle rider's buttocks and a narrow anterior portion which fits between bicycle rider's crotch. The saddle body further includes a concave portion provided between the wider posterior portion and the narrow anterior portion. The saddle body has a highest area located on the wider posterior portion and a lowest area located on the concave portion so that a space with a sufficient depth is defined above the concave portion. Whereby, as riding, bicycle riders can arrange his perineal areas comfortably on the saddle body to relieve pressure placed thereon and dissipate heat generated therein.

In a preferred embodiment of the present invention, the wider posterior portion of the saddle body has a supporting plate on which the highest area located. The concave portion has a base on which the lowest area located, a first inclined section which rises gradually from the lowest area to the supporting plate of the wider posterior portion, and a second inclined section which rises gradually from the lowest area to the narrow anterior portion so that a space with a sufficient depth can be formed above the concave portion.

In another preferred embodiment of the present invention, the saddle body has a mounting portion being U-shaped in transverse cross section and extending downwardly from the underneath side of the saddle body. The bicycle saddle assembly in accordance with the present invention further comprises a mounting means to cooperate with the mounting portion of the saddle body so that the saddle body can be easily mounted on a seat post of a bicycle.

In a further preferred embodiment of the present invention, the mounting means may include an upper device and a lower device. The mounting portion of the saddle body defines an end part to cooperate with the upper device and the lower device to mount the saddle body on a seat post of a bicycle.

BRIEF DESCRIPTION OF THE DRAWINGS

The present invention may be more clearly understood with reference to the following detailed description, in conjunction with the appended drawings of which.

DETAILED DESCRIPTION OF THE INVENTION

Figure 1:
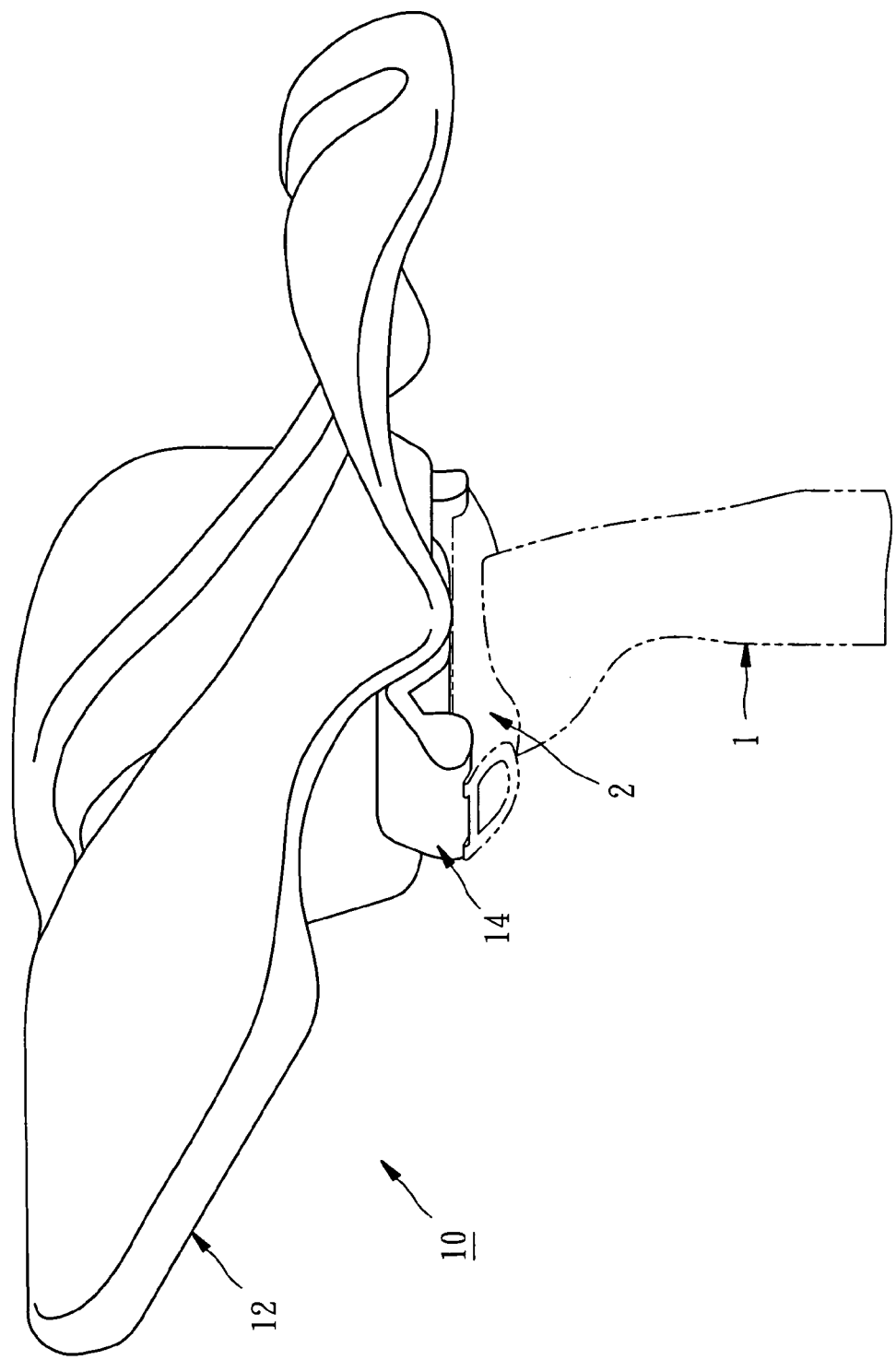
FIG. 1 is a perspective view of a first preferred embodiment according to the present invention more clearly showing the saddle assembly mounting on a seat post of a bicycle.

Referring now to FIGS. 1-12, there can be seen bicycle saddle assembly 10 embodying the present invention. Bicycle saddle assembly 10 includes a saddle body 12 and a mounting means 14 to mount saddle body 12 on a seat post 1 of a bicycle. Saddle body 12 has a wider posterior portion 20 for supporting bicycle rider's buttocks, a narrow anterior portion 22 which fits between bicycle rider's crotch and a concave portion 24 located between wider posterior portion 20 and narrow anterior portion 22.

Figure 8:
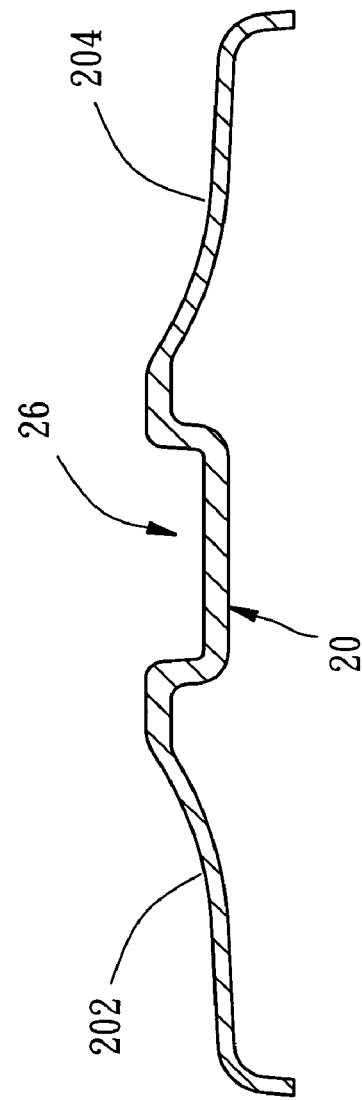
FIG. 8 is a cross-sectional view taken along the line 8-8 of FIG. 6.

Wider posterior portion 20 is a supporting plate with a pair of depressed upper surface 202, 204 respectively provided on either side of the center axis of the saddle body 12 so that the rider's buttocks can closely rest on wider posterior portion 20 (as shown in FIG. 8).

Figure 7:
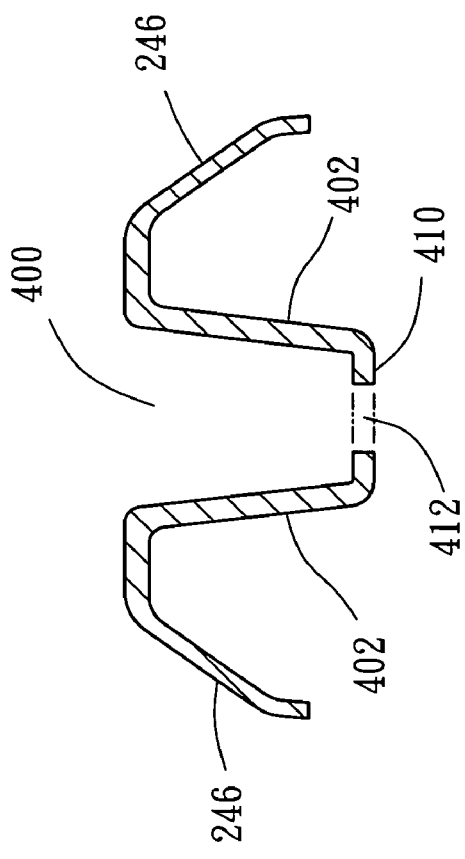
FIG. 7 is a cross-sectional view taken along the line 7-7 of FIG. 6.

Concave portion 24 has a base 240, a first slope section 242 extending upwardly from base 240 to one end of wider posterior portion 20, and a second slop section 244 extending upwardly from base 240 to one end of narrow anterior portion 22. In this embodiment, first slope section 242 is longer than second slope section 244 so that base 240 can be located near narrow anterior portion 22. Particularly, concave portion 24 has a pair of downwardly extending and symmetrically distributed sides 246, so that the rider's crotch can be comfortably fitted thereto (as shown in FIG. 7).

Figure 9:
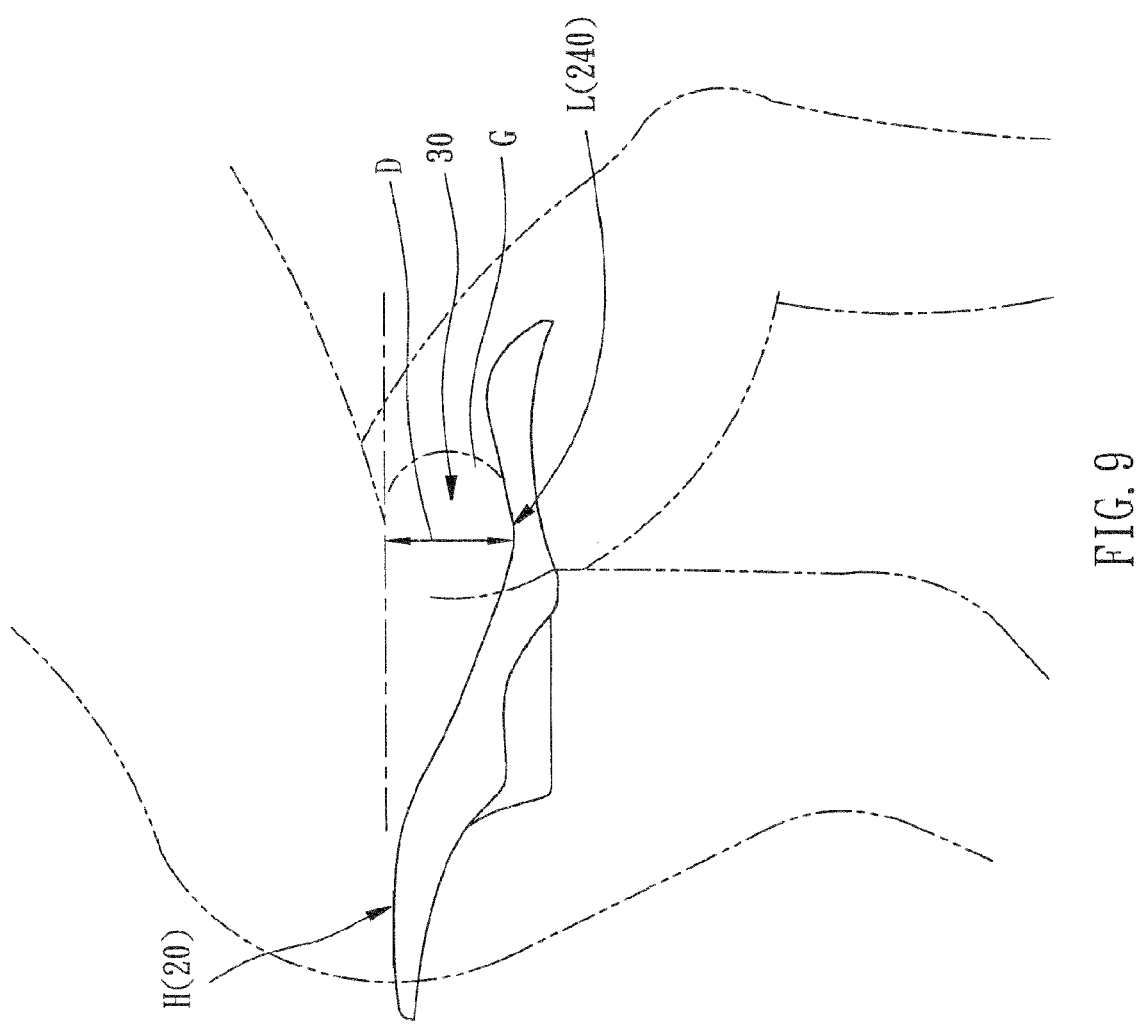
FIG. 9 is a side view of the saddle body of the embodiment shown in FIG. 1 move clearly showing the ways of positioning the genital area in the case of a male rider.

As shown in FIG. 9, saddle body 12 has a highest area H positioned on wider posterior portion 20 and a lowest area L positioned on base 240. The difference D between highest area H and lowest area L varies from 30 mm to 60 mm so as to form a space 30 above concave portion 24 with a sufficient depth to arrange rider's genitals G (as shown by the curved chain line in FIG. 9). In this embodiment, the upper side of saddle body 12 provides a ventilation channel 26 extending along the center axis thereof.

As shown in FIGS. 5-8, extending downwardly from the underneath side of saddle body 12 is a mounting portion 40. Mounting portion 40 has an rectangle upper opening 400, two side walls 402 extending respectively and downwardly from each long side of upper opening 400, a front wall 406, a rear opening 408, a rear reinforced edge 409 and a bottom wall 410 with a long cut 412. In this embodiment, bottom wall 410 is horizontally provided so that each side wall 402 has a short front side 414 and a long rear side 416.

Figure 10:
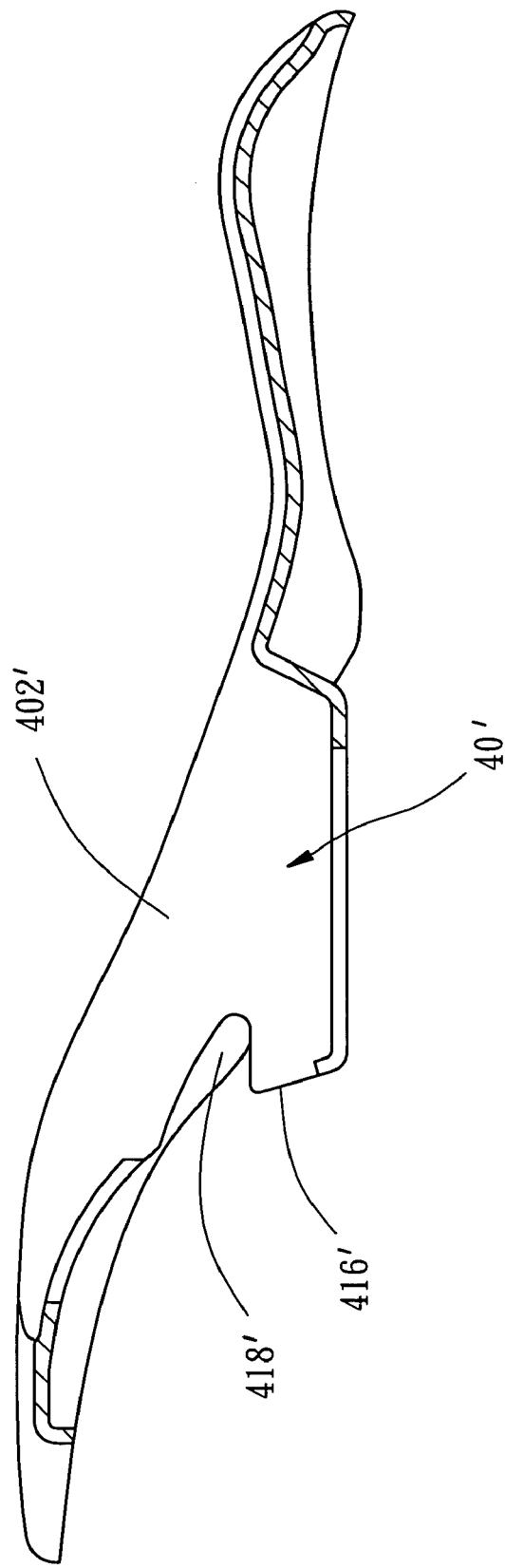
FIG. 10 is a side view of a saddle body of a second preferred embodiment according to the present invention.
Figure 11:
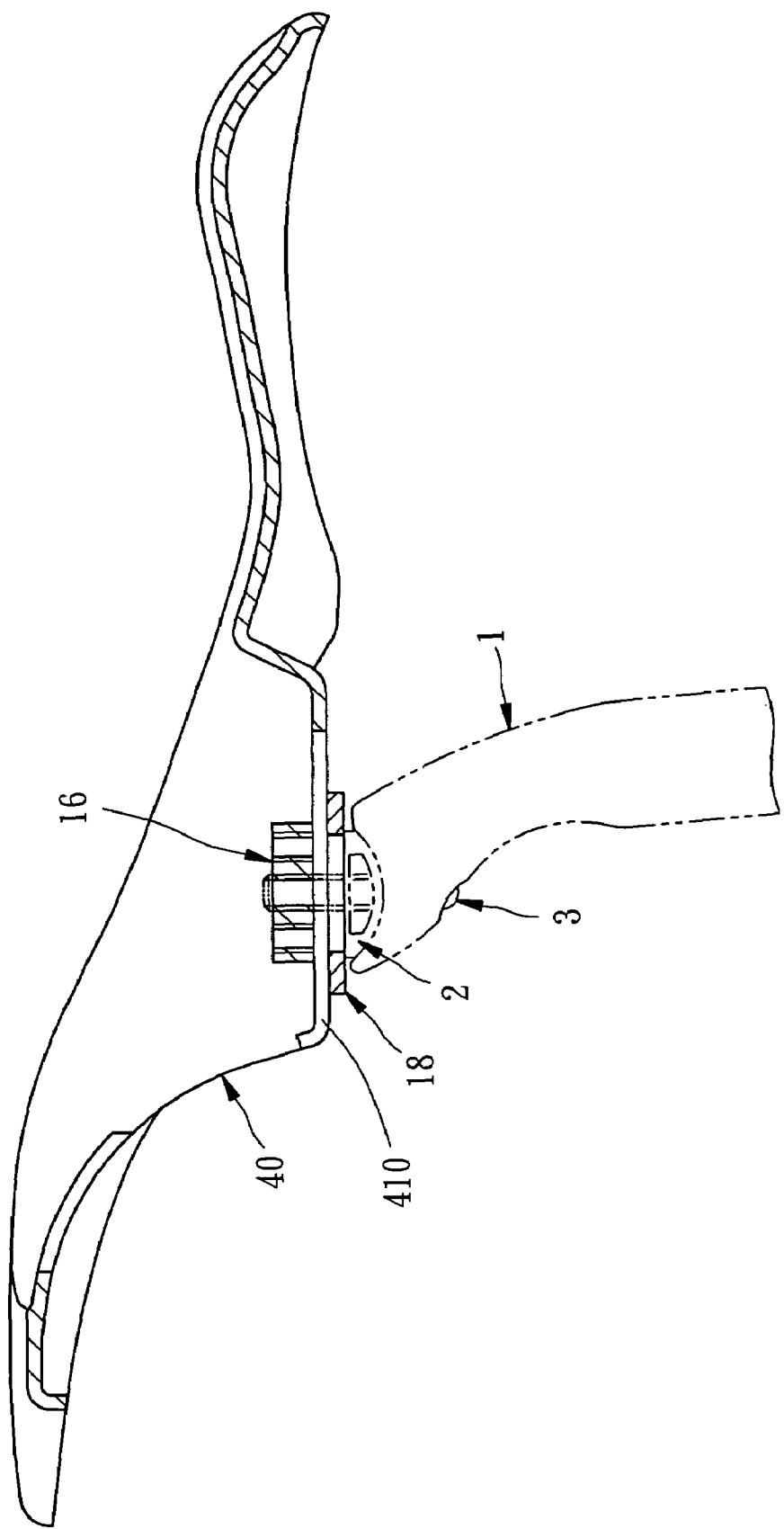
FIG. 11 is a cross-sectional view taken along the line 11-11 of FIG. 3.
Figure 12:
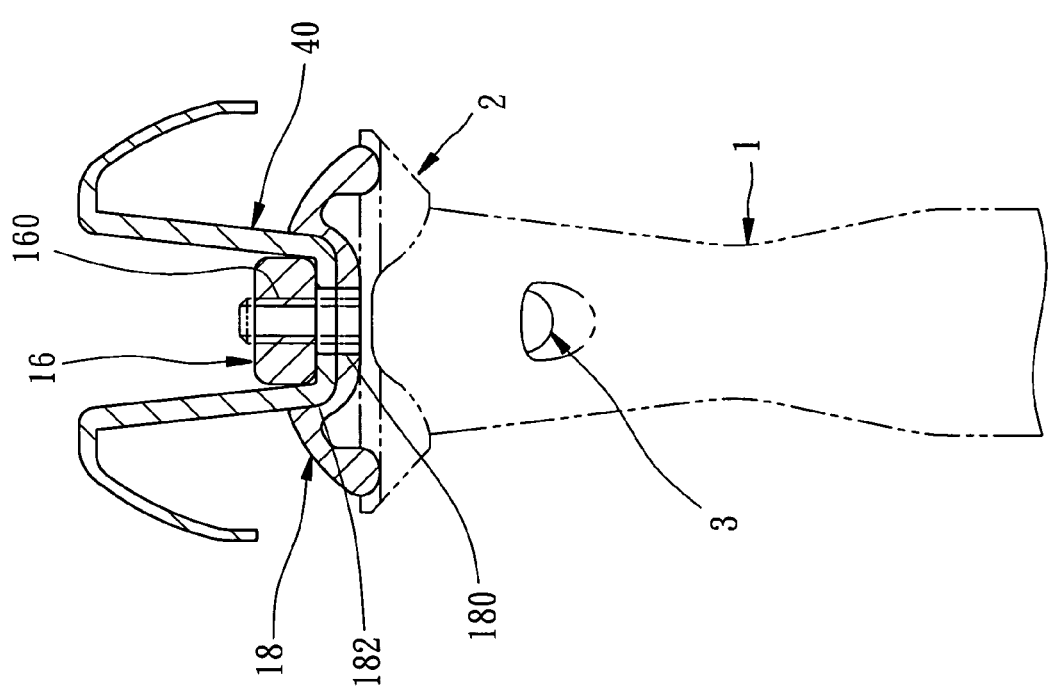
FIG. 12 is a cross-sectional view taken along the line 12-12 of FIG. 4.

Please referring to FIG. 10, in another embodiment, long rear side 416' of each side wall 402' of mounting portion 40' has a cove 418' so that each side wall 402' will function as a buffer to absorb the shocks as riding.

Figure 2:
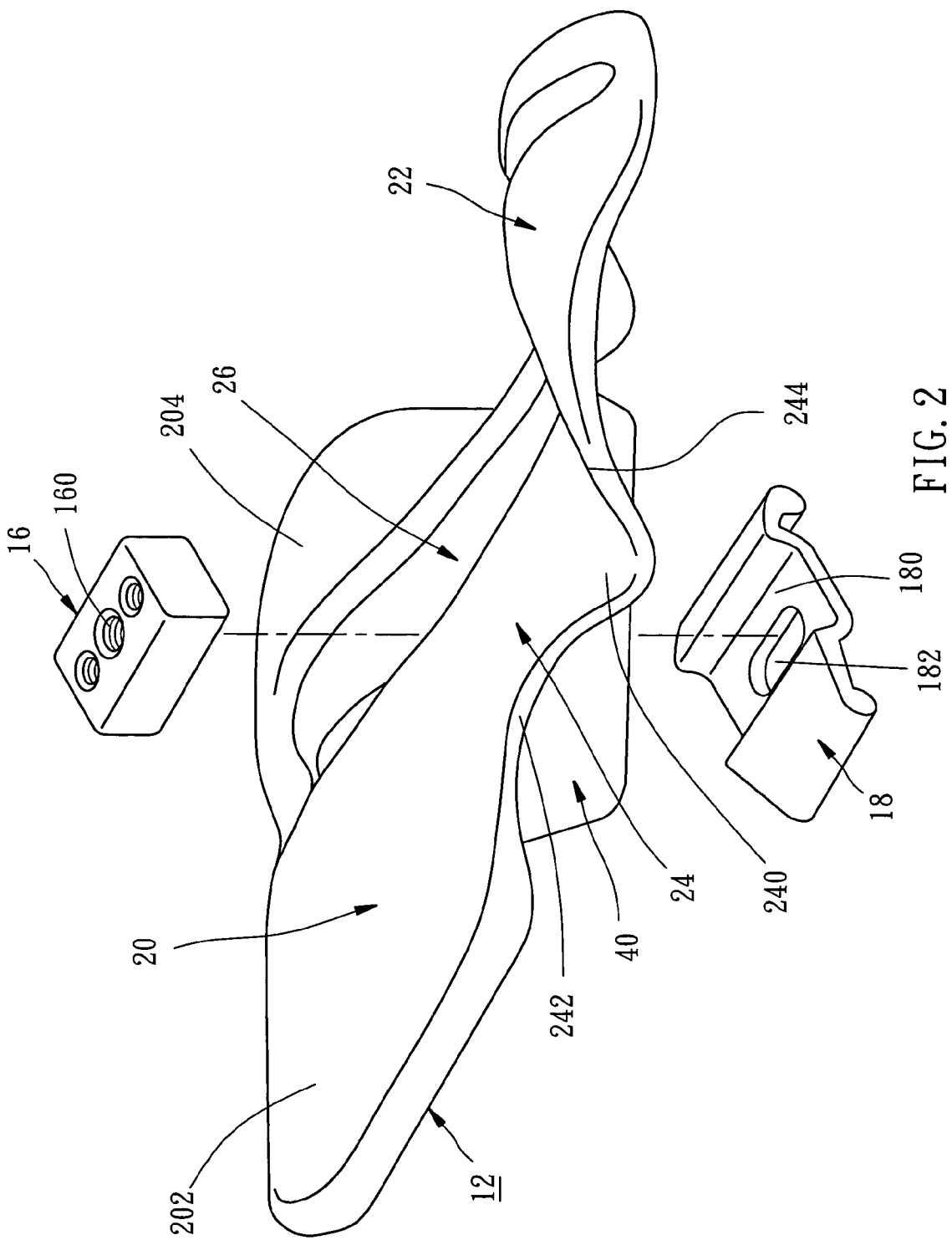
FIG. 2 is an exploded view of the embodiment shown in FIG. 1.
Figure 3:
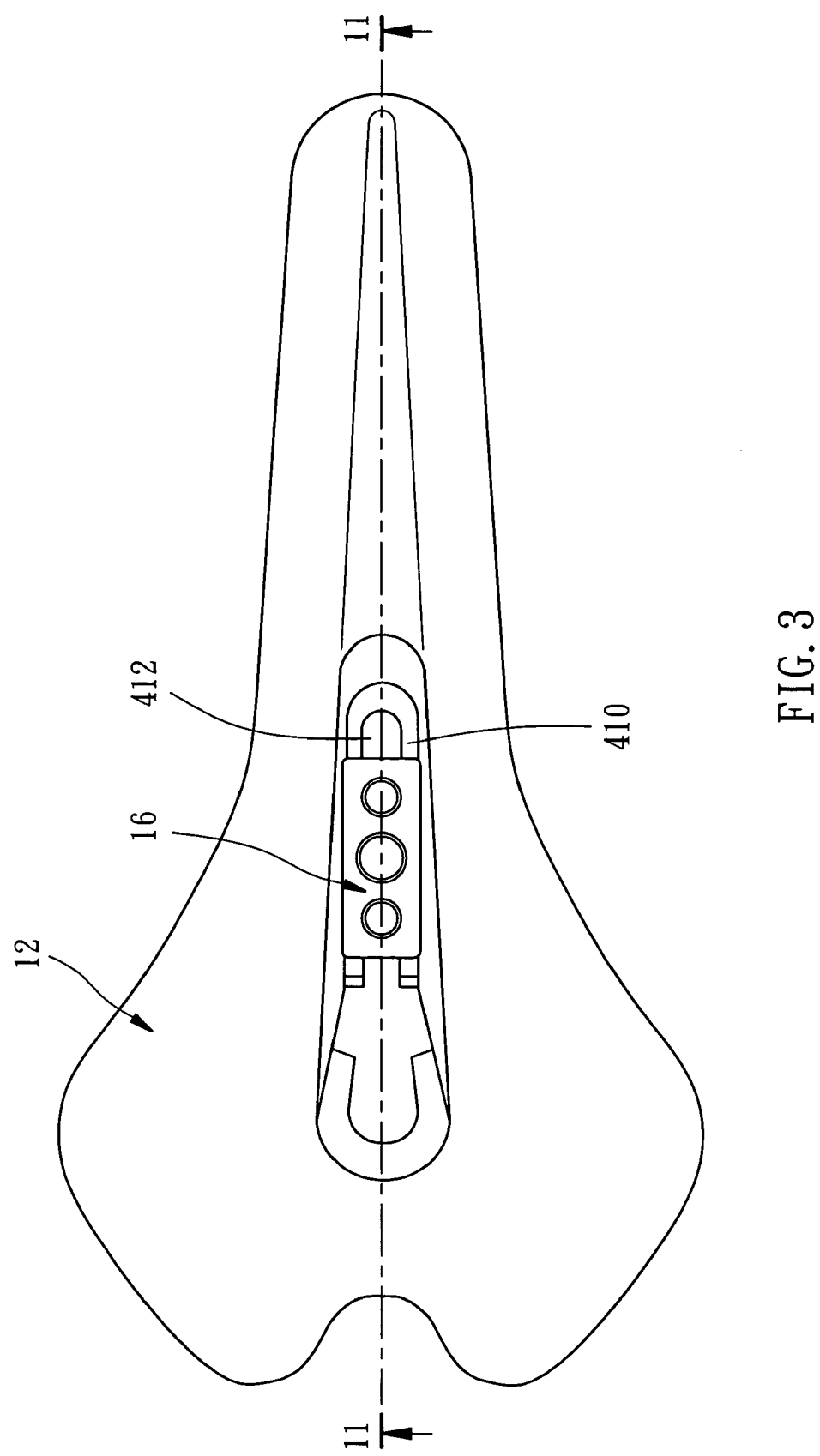
FIG. 3 is a top view of the embodiment shown in FIG. 1.
Figure 4:
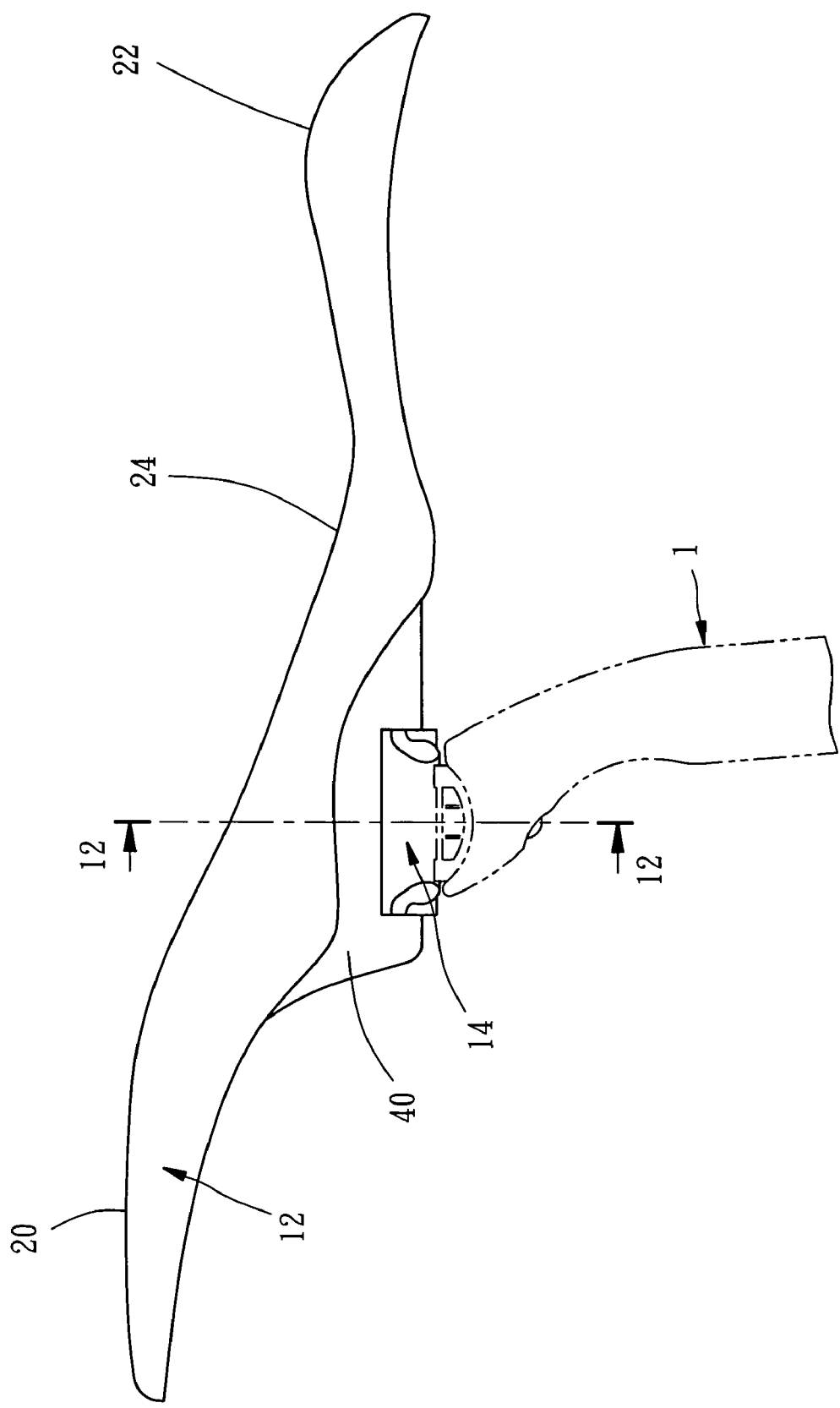
FIG. 4 is a side view of the embodiment shown in FIG. 1.
Figure 5:
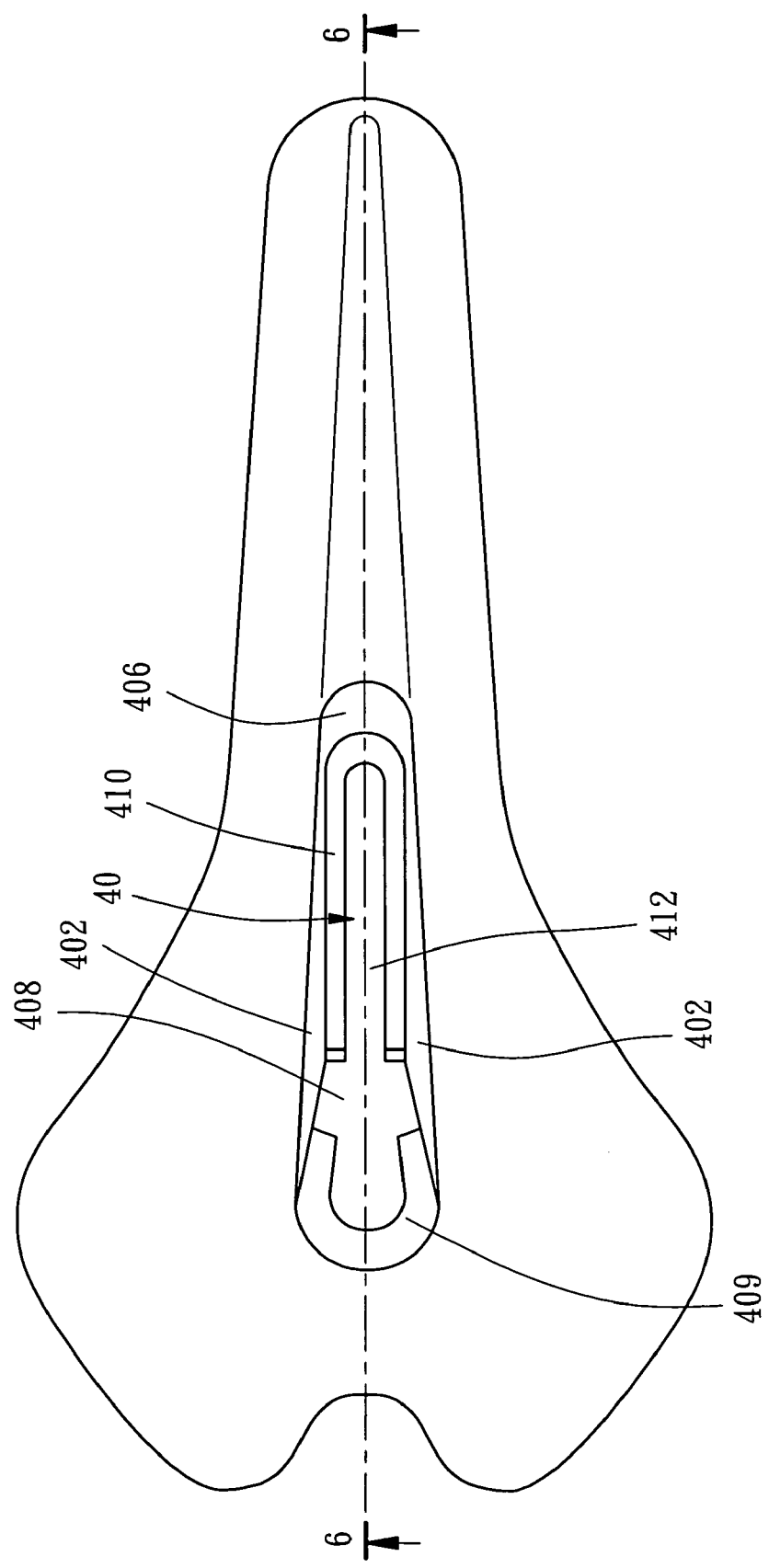
FIG. 5 is a top view of a saddle body of the embodiment shown in FIG. 1.
Figure 6:
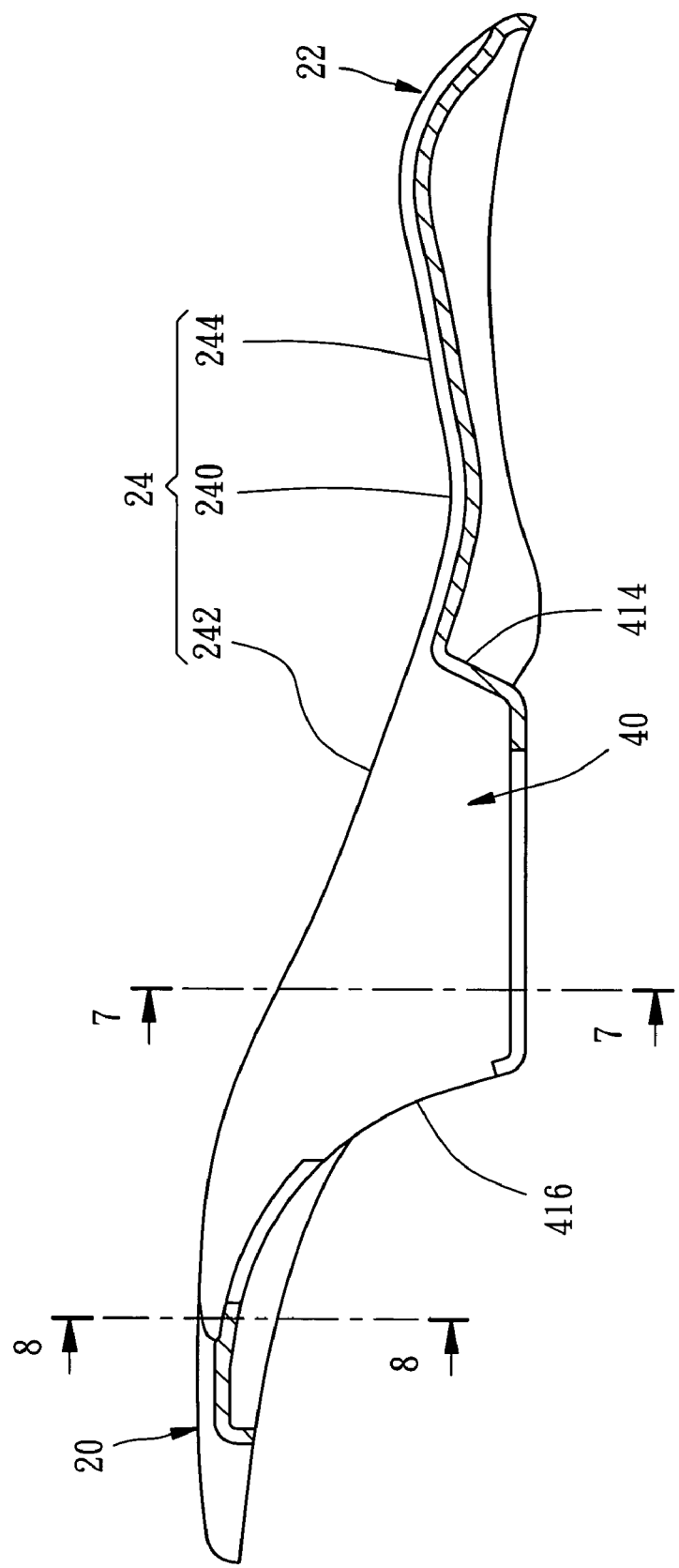
FIG. 6 is a cross-sectional view taken along the line 6-6 of FIG. 5.

Mounting means 14 is designed to cooperate with mounting portion 40 of saddle body 12 so that saddle body 12 can be easily mounted on seat post 1 of a bicycle. Mounting means 14 includes an upper device 16 with at least a threaded hole 160 and a lower device 18 with a center groove 180 and a long hole 182 (as shown in FIG. 2).

In mounting, upper device 16 is placed into the inside of mounting portion 40 from upper opening 400 and against the upper surface of bottom wall 410. The lower device 18 is placed under the lower surface of bottom wall 410 in such a way that the end part of mounting portion 40 can be received in center groove 180 of the lower device 18. In this embodiment, a prior art connecting device 2 is placed on the top end of seat post 1 to cooperate with the lower device 18 so that a bolt 3 can be inserted through a hole provided on seat post 1, long hole 182 of the lower device 18 and screwed into threaded hole 160 of upper device 16 to mount saddle body 12 on seat post 1.

Figure 13:
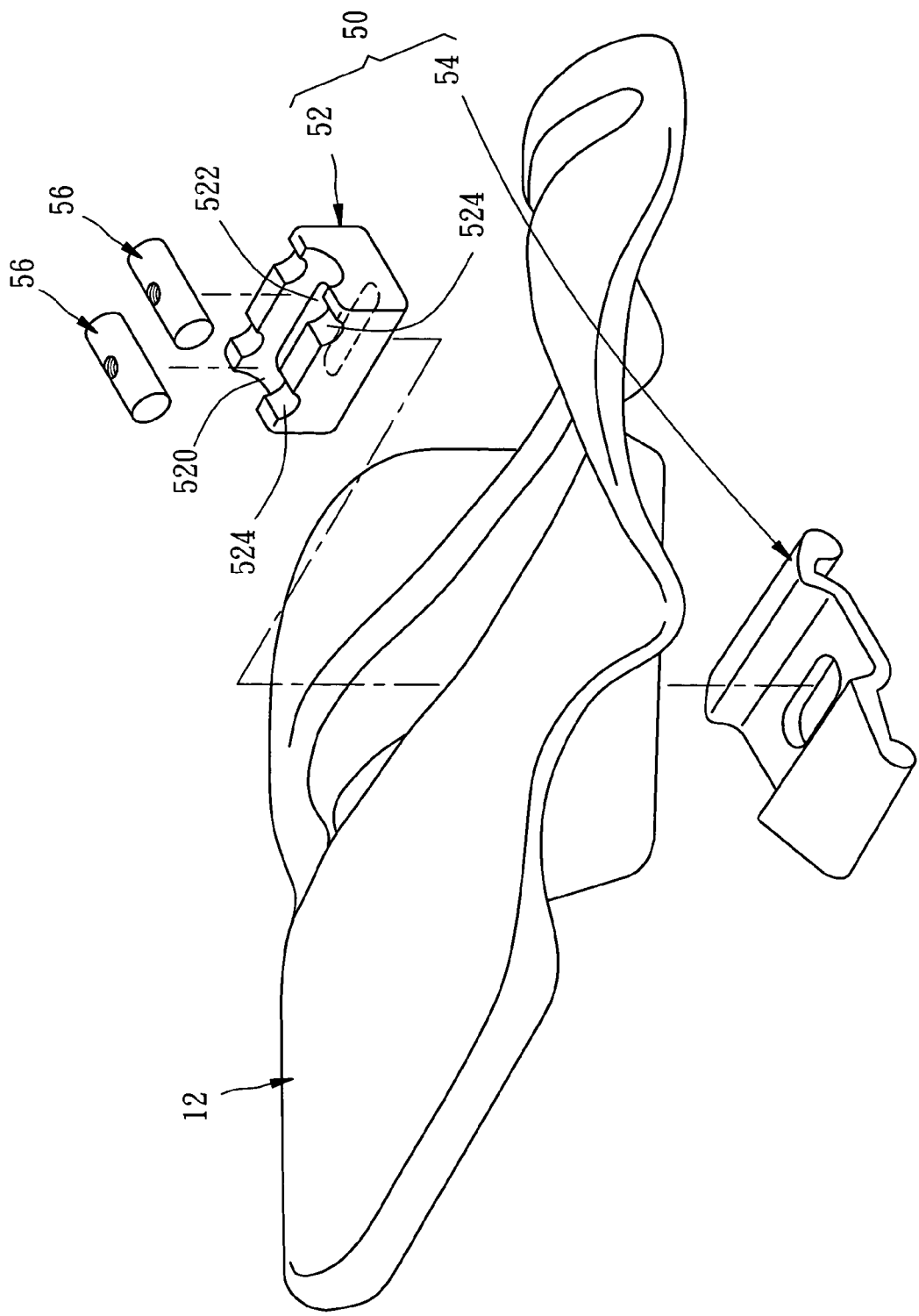
FIG. 13 is an exploded view of a third preferred embodiment according to the present invention.
Figure 14:
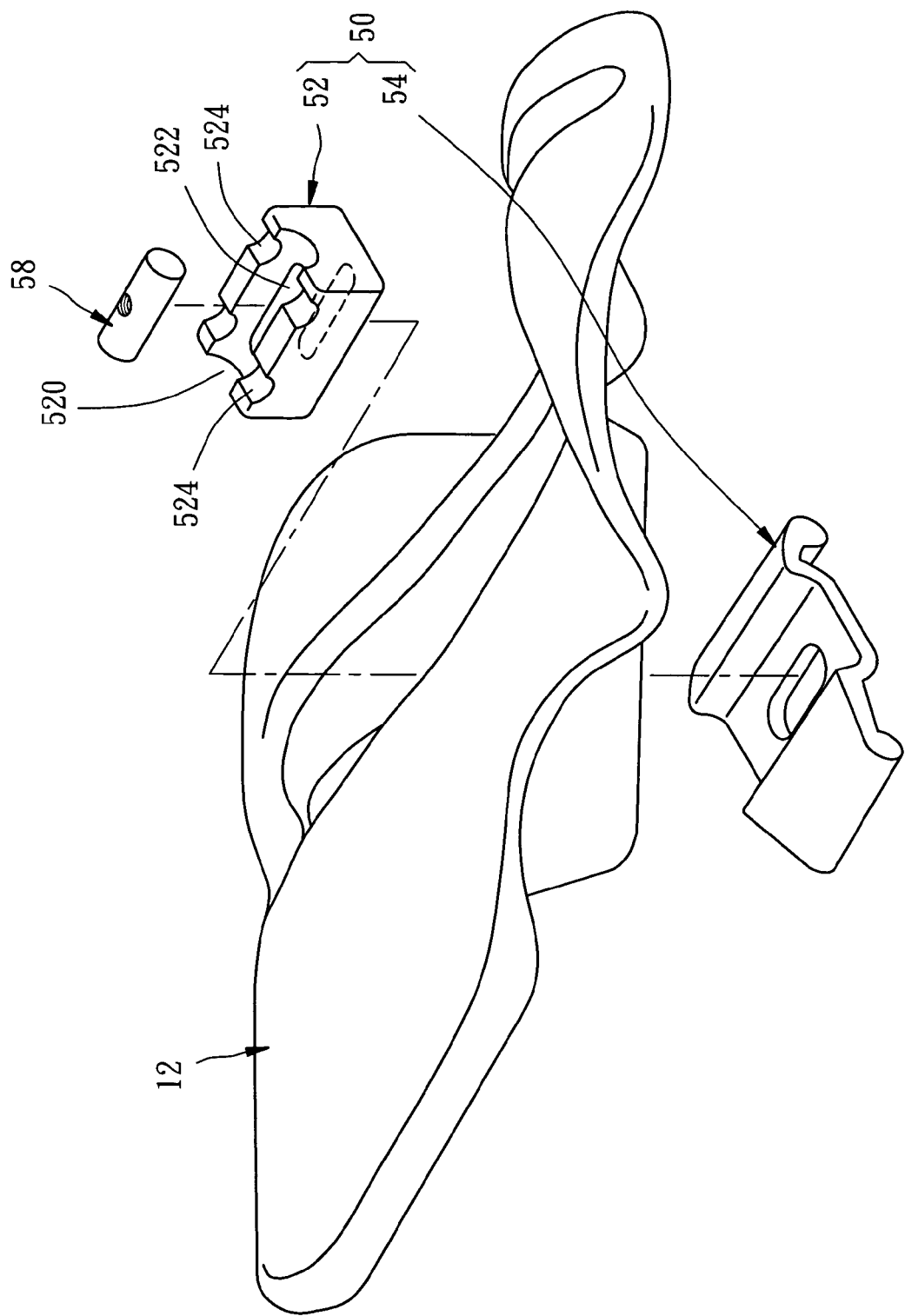
FIG. 14 is an exploded view of a fourth preferred embodiment according to the present invention.

Referring further to FIGS. 13 and 14, in another embodiment, a mounting means 50 has an upper device 52 and a lower device 54. Upper device 52 is designed to have a lengthwise trench 520, a long hole 522 and two crosswise trenches 524. The lower device 54 is the same as mounting means 14. In mounting, two short nuts 56 are used to be respectively received in each crosswise trench 524 and screwed into by a bolt. Alternatively, in a further embodiment, a long nut 58 is used to be received in lengthwise trench 520 and screwed into by a bolt.

What is claimed is:

1. A bicycle saddle assembly adapted to be mounted on a bicycle, said saddle assembly comprising:
   a saddle body having (1) a posterior portion convex along its length, and adequate to support a user's buttock, and
   (2) an anterior portion which is shorter in length and narrower than the posterior portion to permit location thereof between the user's legs;
   said bicycle saddle being adapted and constructed to be mounted on the bicycle in a position such that said posterior portion is substantially higher from ground than said anterior portion;
   wherein said (1) posterior portion and said (2) anterior portion are fixed together as a unit by (3) a concave portion which is lower from ground than either said posterior portion or said anterior portion so as to form a space above said concave portion to comfortably accommodate the genitals of the user;
   wherein the posterior portion of said saddle has a highest area and a lowest area, and a widest section of the posterior portion of said saddle body has a supporting plate on which said highest area located.

2. The bicycle saddle assembly as claimed in claim 1, wherein a difference between the highest area of the posterior portion and the lowest area of the anterior portion varies from 30 to 60 mm.

3. The bicycle saddle assembly as claimed in claim 1, wherein said supporting plate has a pair of depressed upper surfaces respectively distributed on either side of the longitudinal axis of said saddle body so that the user's buttock can closely rest on said widest section of the posterior portion.

4. The bicycle saddle assembly as claimed in claim 1, wherein said concave portion has a base on which a lowest area of the concave portion is located and a first sloping section rises gradually from said lowest area to said highest area of the posterior portion, and a second sloping section rises gradually from said lowest area of the concave portion to said anterior portion so that said space is defined above said concave portion.

5. The bicycle saddle assembly as claimed in claim 1, wherein an upper side of said saddle body has a ventilation channel extending along the longitudinal axis of said saddle body.

6. The bicycle saddle assembly as claimed in claim 1, wherein said saddle body has a mounting portion which is U-shaped in transverse cross section with an open side and a closed side, and the closed side of the U-shaped mounting portion extends downwardly from an underneath side of said saddle body.

7. The bicycle saddle assembly as claimed in claim 6, wherein said mounting portion includes an upper opening with two long sides formed on an upper side of said saddle body, two side walls extending downwardly from each of said long sides, and a bottom wall.

8. The bicycle saddle assembly as claimed in claim 7, wherein said mounting portion further includes a rear opening with a rear reinforced edge.

9. The bicycle saddle assembly as claimed in claim 7, wherein each said side wall has a long side and a short side.

10. The bicycle saddle assembly as claimed in claim 9, wherein said long side of said side wall has a cove to absorb shock when riding.

11. The bicycle saddle assembly as claimed in claim 6, further comprising a mounting means to cooperate with said mounting portion of said saddle body so that said saddle body can be easily mounted on a seat post of the bicycle.

12. The bicycle saddle assembly as claimed in claim 11, wherein said mounting means includes an upper device and a lower device, said mounting portion of said saddle body has an end part to cooperate with said upper device and said lower device to mount said saddle body on the seat post of the bicycle.

13. The bicycle saddle assembly as claimed in claim 12, wherein said upper device has at least a threaded hole and an under device has a center groove and a long hole.

14. The bicycle saddle assembly as claimed in claim 12, wherein said upper device has a lengthwise trench and a long hole, said under device has a center groove and a long hole, said mounting means further including a long nut received in said lengthwise trench to be screwed into by a bolt.

15. The bicycle saddle assembly as claimed in claim 12, wherein said upper device has a long hole and two crosswise trenches, said under device has a center groove and a long hole, said mounting means further includes at least a short nut received in said crosswise trench to be screwed into by a bolt.

16. A bicycle saddle assembly adapted to be mounted on a bicycle, said saddle assembly comprising:

a saddle body having (1) a posterior portion convex along its length, and adequate to support a user's buttock, and (2) an anterior portion which is shorter in length and narrower than the posterior portion to permit location thereof between the user's legs;

said saddle assembly being mountable on the bicycle so that said posterior portion is higher from ground than said anterior portion;

wherein said (1) posterior portion and said (2) anterior portion are fixed together as a unit by (3) a concave portion which is lower from ground than either said posterior portion or said anterior portion so as to form a space above said concave portion to comfortably accommodate the genitals of the user, wherein said concave portion has a base on which a lowest area of the concave portion is located and a first sloping section rises gradually from said lowest area to said highest area of the posterior portion, and a second sloping section rises gradually from said lowest area of the concave portion to said anterior portion so that said space is defined above said concave portion.

17. The bicycle saddle assembly as claimed in claim 16, wherein the length of said first sloping section is longer than that of said second sloping section.

18. The bicycle saddle assembly as claimed in claim 16, wherein said concave portion has a pair of downwardly extending and symmetrically distributed sides so that the user's crotch can be comfortably fitted thereto.

\* \* \* \* \*